April 5, 1927.

J. H. RUTTLE 1,623,275

BEAN SEPARATING MACHINE

Filed May 19, 1924   2 Sheets-Sheet 1

Inventor

John H. Ruttle,

By

Attorneys

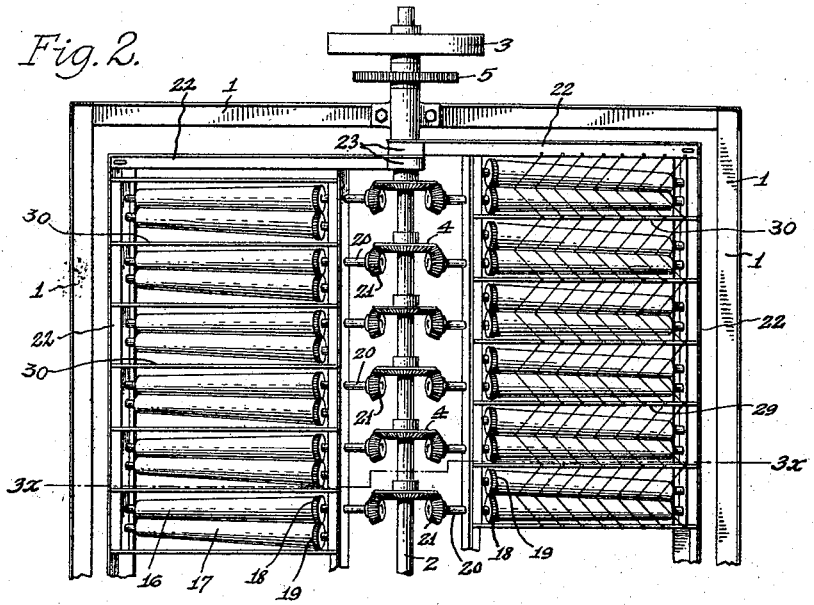

Patented Apr. 5, 1927.

1,623,275

UNITED STATES PATENT OFFICE.

JOHN H. RUTTLE, OF CARSONVILLE, MICHIGAN.

BEAN-SEPARATING MACHINE.

Application filed May 19, 1924. Serial No. 714,330.

This invention has reference to separating machines for the purpose of selecting and separating beans whereby those which are not in a desirable condition are eliminated and the good ones permitted to complete their passage down a runway to a suitable receptacle.

Hitherto for such purpose it has been known to use a pair of rolls arranged to form a runway for the beans and arranged for inward rotation in respect to such beans whereby certain of them would be gripped and drawn between the said rolls thereby being rejected from the runway whilst the good beans, being smooth and not liable to be so gripped by the rolls, continue to pass down the runway to a suitable receptacle.

It has been found in practice that in machines of such type, and in the several other types of bean separating devices as hitherto known, economy in the selection of the beans was not being adequately secured, as considerable waste resulted in the rejection of good beans or the retention of poor beans to an undesirable extent.

In the inwardly rotating roll type of machine referred to, it has been very difficult to prevent the gripping of good beans which it was not desired to reject from the runway, and this objection could only be minimized by very fine adjustment of the speed and spacing of the rolls and the use of particularly suitable material in the rolls themselves.

It is, therefore, the principal object of this invention to provide a form of separator which will admit of considerably more accurate selection of the beans and in which the surface characteristics of the beans will play a greater part in governing such selection.

It is also an object to provide means whereby the separation of beans will be effected by the lifting of the poor beans upwardly from the bed of the runway whilst permitting the good beans to pass down the said runway, and it is a still further object to provide for the interception of beans which may be lifted by the action of the runway rolls as they pass above the runway, and to effect the rejection of such beans when so intercepted.

A still further object is to reduce the height to which a bean must be raised, in order to be rejected from the runway, more or less in proportion to the extent to which it has passed down the said runway whereby initial retention of a bean in the upper parts of the said runway may in some cases be followed by eventual rejection at a lower point in the said runway, due to lessened height to which the bean must be raised for such rejection.

Still further objects subsidiary to or resulting from the aforesaid objects, or from the construction or operation of the invention as it may be carried into effect, will become apparent as the said invention is hereinafter further disclosed.

In carrying the said invention into effect, I may provide the novel arrangement of parts wherein a bean separating machine has separating rolls arranged in pairs, each pair inclined to form a runway for beans suitably fed to the upper part of said rolls, means being provided to effect the rotation outwardly of the said rolls whereby said rolls will have a tendency to lift up and carry over from the runway any beans which, by the nature of their exterior, tend to adhere to the surface of one or the other of the rolls; and, to further facilitate the selecting and rejection of such beans it is proposed to provide a series of baffles bridging the said rolls and arranged to permit normal passage of beans down the said runway whilst intercepting beans which are lifted to any appreciable extent by the action of the rolls, such interception assisting in the rejection of such beans; and it is still further proposed to provide such baffles with forwardly extending center portions, or to use baffles of a substantially V-shape, whereby the rejecting of defective beans will be still further facilitated. All of which is more particularly described and ascertained hereinafter, by way of example, having reference to the accompanying drawings, in which—

Fig. 2 is a plan view of the same with the feed mechanism removed and also showing the baffles on one side of the machine only;

Fig. 3 is a transverse section of the machine taken on the line $3^x$—$3^x$, Fig. 2;

Figure 1:
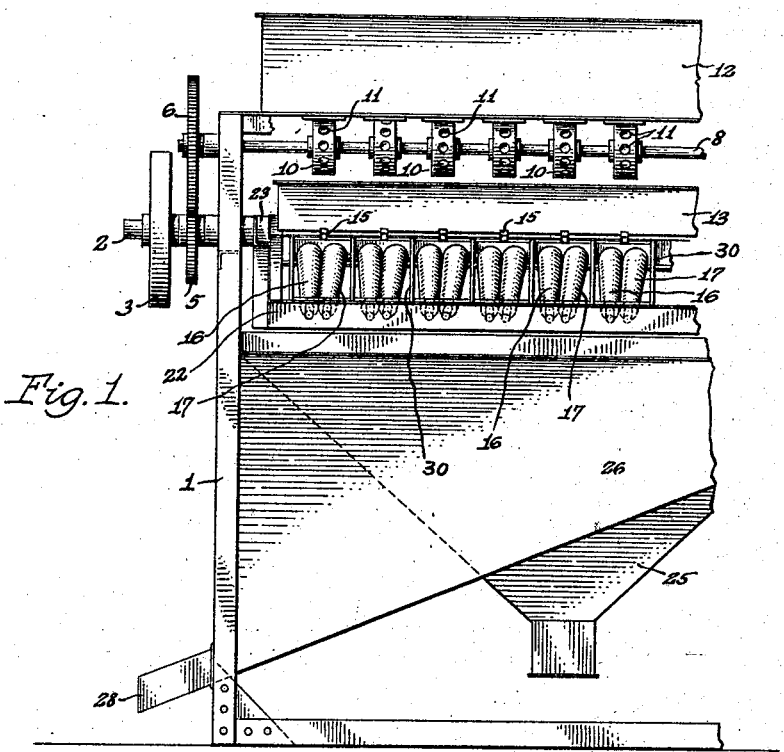
Figure 1 is a fragmentary side elevation of a bean separator embodying the said invention but having the baffles removed.
Figure 4:
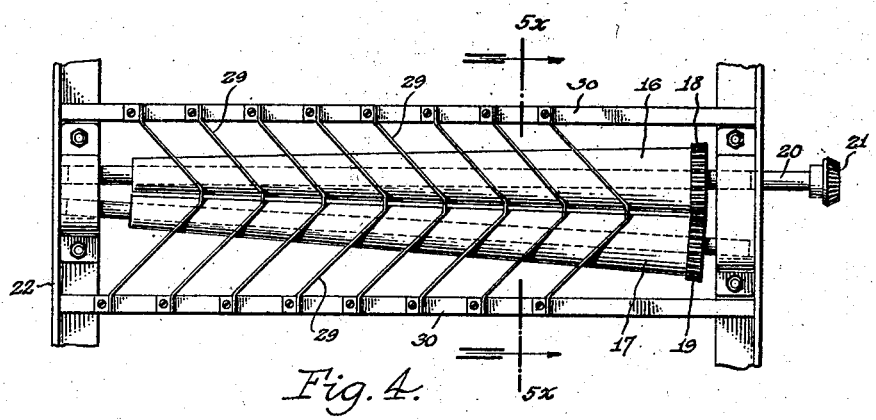
Fig. 4 is a detail plan view of a pair of rolls forming a runway with the baffles mounted in the frame of the machine.
Figure 5:
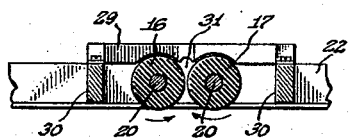
Fig. 5 is a cross section of the same taken on the line $5^x$—$5^x$, Fig. 4.

Similar characters of reference indicate similar parts in the several figures of the drawing and Figs. 4 and 5 are drawn to a larger scale than are Figs. 1, 2 and 3.

1 is a frame in which is journaled a main shaft 2 carrying a pulley 3 and having mounted thereon a series of bevel gears 4 and also a spur gear 5 which in turn meshes with further gears 6 and 7. These latter gears are mounted upon shafts 8 and 9 journaled in the said frame.

The shaft 2 effects the operation of the separating mechanism about to be described, and the shafts 8 and 9 effect the operation of the feed mechanism. This mechanism is shown as comprising a series of drums 10 having a plurality of recesses 11 in their peripheries, each recess being preferably proportioned to receive one bean at a time from a hopper 12 superimposed above the said drums 11 and having suitable openings therein to permit of the passage of beans into the recesses in said drum.

Beneath each series of drums carried by the shafts 8 and 9 are small hoppers or receivers 13 and 14 having restricted outlets 15 corresponding to each of the drums, so that as the beans successively fall from the said drums into the receivers 13 and 14 they may escape therefrom at certain definite points dependent upon the positions of the outlets 15.

Pairs of inclined rolls 16 and 17 are arranged beneath each of the said outlets 15, the upper ends of the said pairs of rolls being adjacent said outlets, and connected by meshed gears 18 and 19. One of the rolls of each pair of gears has an extended shaft 20 which carries a bevel pinion 21 meshing with one of the bevel gears 4 on the main shaft 2 in such manner that the rotation of the said shaft 2 in the direction indicated by the arrow in Figs. 2 and 3 will result in the rotation of the pairs of rolls outwardly or in the relative directions indicated by the arrows in Fig. 5 of the drawings. The sets of rolls described are indicated as being supported in a subsidiary framework 22 pivotally supported at the upper end upon the main shaft 23 and supported at its lower ends by chains 24, so that the inclination of the said rolls may be varied by the adjustment of the length of the said chains if thought necessary or desirable.

It will be apparent that the different pairs of rolls form runways for the beans which fall from the openings 15 of the receiver 13, and it will be also understood (and may be duly ascertained by experiment) that beans having dry surfaces may pass down such runways without much interference as the rolls are rotating, but in the case of beans having rough, damp, or more or less adhesive surfaces such as are encountered in poor beans, these will be lifted from the bed of the runway, (the bed being, of course, the contiguous parts of the two rolls), and may be completely carried over the crest of one or the other of the rolls by such adhesive action.

The lifting effect may vary for different beans, some being less liable to be so rejected from the runway than others and in order to secure closer rejection I may taper the rolls downwardly, or toward their lower ends as illustrated, whereby beans which have not been lifted sufficiently to pass over the rolls in the upper stages of the runway may still be rejected in the lower stages thereof, as a result of the reduced height above the axes of the rolls to which they are required to be lifted due to the tapered nature of said rolls.

It will be seen that with the tapered rolls the axes of the two rolls constituting a pair are converged towards their lower end in order to maintain the meeting faces of the rolls parallel.

25 is a large hopper which is situated beneath the rolls and adapted to receive the rejected beans thrown therefrom and 26 and 27 are chutes forming a common hopper having an outlet 28 and opening in proximity to the lower ends of the said rolls to receive the good beans which have passed completely down the runway, not having been lifted sufficiently in their travel on the same to be thrown over the rolls by the action thereof into the hopper 25.

In order to assist in the selective action of the rolls, I propose to provide each pair of rolls with a series of baffles 29. These are shown as being carried by bars 30 forming part of the said framework 22 and bridge the rolls 16 and 17, the said baffles being so shaped as to leave only a restricted opening 31 beneath each of them through which beans may travel from the runway formed by the said rolls, so that it will be apparent that if a bean does not remain upon the bed of the runway when traveling down the same and is lifted beyond a certain extent by the action of the rolls forming the runway, it will impinge against one or other of the said baffles 29 which will increase the tendency to throw the bean over the roll into the hopper 25. This action may be still further facilitated by making the center portions of the said baffles so that they extend forwardly and more or less upwardly in opposition to the downward travel of the beans, the baffles in the drawings being illustrated as of a V-shaped configuration with their spaces extending forwardly over the centers of the runways.

It will be apparent that many different materials may be employed in said rolls according to circumstances and requirements and that the nature of the surface of the rolls may be varied according to the conditions which they have to meet; and it will also be understood that the extent of inclination of the rolls and the speed of rotation thereof are also governed by and may be varied to suit changing conditions.

A device such as that described may be easily and cheaply constructed and admits of very easy and efficient operation, waste due to incomplete rejection of poor beans or incomplete retention of good beans being reduced to a minimum.

This invention may be developed within the scope of the following claims without departing from the essential features of the said invention and it is desired that the specification and drawings be read as being merely illustrative and not in a limiting sense except as necessitated by the prior art.

What I claim is:—

1. In a bean separating machine of the class described, a pair of inclined rolls arranged side by side, said rolls being tapered towards the lower ends and the axes thereof converged to maintain parallel relation between the meeting faces of the said rolls thereby forming a runway, feeding mechanism at the upper ends of said rolls, and means rotating said rolls outwardly with respect one to the other, whereby beans having rough or adhesive surfaces are lifted over said rolls.

2. In a bean separating machine, a runway comprising a pair of inclined rolls, having outward rotation, and a series of baffles bridging said rolls whereby beans traveling down said runway are lifted by the outward rotary action of said rolls and deflected therefrom, for the purposes specified.

3. In a bean separating machine, a runway comprising a pair of inclined rolls tapered downwardly, the opposed faces of said rolls being parallel and rotating outwardly, and a series of baffles bridging said rolls and adapted to intercept and deflect therefrom beans which may be lifted by the outward rotary action thereof while passing down said runway.

4. In a bean separating machine, a runway comprising a pair of inclined rolls, having outward rotation, and a series of baffles bridging said rolls whereby beans traveling down said runway and lifted by the outward rotary action of said rolls are deflected therefrom, the center portions of said baffles extending forwardly in opposition to the travel of beans down said runway.

5. In a bean separating machine, a runway comprising a pair of inclined outwardly rotating rolls and a series of bean intercepting and deflecting V-shaped baffles bridging said rolls and arranged with their apices towards the receiving end of said runway, the apices of said baffles having a limited clearance above said runway.

6. In a bean separating machine, a runway comprising a pair of inclined rolls tapered downwardly, the opposed faces of said rolls being parallel and rotating outwardly, and a series of baffles bridging said rolls and having their center portions extending forwardly towards the receiving end of said runway, and having a definitely restricted clearance above the center part of said runway.

In testimony whereof I affix my signature.

JOHN H. RUTTLE.